United States Patent [19]  [11] Patent Number: 4,563,724
Behn  [45] Date of Patent: Jan. 7, 1986

[54] ELECTRICAL CAPACITOR CONSISTING OF A CONSOLIDATED STACK OF MUTUALLY LAYERED, METALLIZED DIELECTRIC PLIES AND A METHOD FOR THE MANUFACTURE THEREOF

[75] Inventor: Reinhard Behn, Munich, Fed. Rep. of Germany

[73] Assignee: Siemens Aktiengesellschaft, Berlin & Munich, Fed. Rep. of Germany

[21] Appl. No.: 657,188

[22] Filed: Oct. 3, 1984

[30] Foreign Application Priority Data

Nov. 23, 1983 [DE] Fed. Rep. of Germany ....... 3342329

[51] Int. Cl.⁴ ................... H02B 1/04; H01G 13/06; H01G 4/08
[52] U.S. Cl. .................... 361/306; 29/25.42; 361/323
[58] Field of Search .............. 361/306, 308, 309, 310, 361/321 C, 323, 433 C, 433 S; 29/25.42

[56] References Cited

U.S. PATENT DOCUMENTS

| 1,128,058 | 2/1915 | Schoop | 428/548 |
| 3,444,436 | 5/1969 | Coda | 317/101 |
| 3,590,347 | 6/1971 | Gottlob et al. | 317/258 |
| 3,614,561 | 10/1971 | Behn et al. | 317/258 |
| 3,651,548 | 3/1972 | Behn | 29/25.42 |
| 3,670,378 | 6/1972 | Behn et al. | 29/25.42 |
| 3,693,244 | 9/1972 | Behn et al. | 29/492 |
| 3,701,211 | 1/1973 | Behn et al. | 317/261 |
| 3,728,765 | 4/1973 | Behn et al. | 29/25.42 |
| 3,740,624 | 6/1973 | McAdams, Jr. et al. | 361/321 |
| 4,041,587 | 8/1977 | Kraus | 29/25.42 |

FOREIGN PATENT DOCUMENTS

| 2348904 | 4/1975 | Fed. Rep. of Germany . |
| 2416566 | 5/1976 | Fed. Rep. of Germany . |
| 686293 | 1/1953 | United Kingdom . |
| 1220567 | 1/1971 | United Kingdom . |
| 1289206 | 9/1972 | United Kingdom . |

OTHER PUBLICATIONS

IBM Technical Disclosure Bulletin, vol. 24, No. 1B, Jun. 1981, "Bottom Terminated, Low Inductance Ceramic Chip Capacitor", by J. N. Humenik (pp. 437–440).
IBM Technical Disclosure Bulletin, vol. 25, No. 10, Mar. 1983, pp. 5366 and 5367, entitled "High Capacitance, Highly Reliable, Multilayer Capacitor Chips".
English Language Edition of Siemens Brochure "Ideally Suitable for PC Board Mounting: Metallized Plastic Layer Capacitors", No. B 21/1210.101, WS 3766.

Primary Examiner—Donald A. Griffin
Attorney, Agent, or Firm—Hill, Van Santen, Steadman & Simpson

[57] ABSTRACT

A capacitor comprising a consolidated stack of mutually layered dielectric plies which are provided with a respective metal layer as coating. An incision is provided at one side by means of which the individual dielectric plies are lent projections on which, alternating from ply-to-ply, the coatings are interrupted by means of insulating strips so that the metallizations situated on the surfaces formed by the projections alternately connect antipolar coatings to one another. A method of the invention provides that metallized plastic tapes be provided with corresponding, metal-free strips and be thereafter wound onto a drum, whereupon the incisions are produced in the occurring mother capacitors and the individual stacks are subsequently separated from the mother capacitors.

16 Claims, 9 Drawing Figures

ELECTRICAL CAPACITOR CONSISTING OF A CONSOLIDATED STACK OF MUTUALLY LAYERED, METALLIZED DIELECTRIC PLIES AND A METHOD FOR THE MANUFACTURE THEREOF

BACKGROUND OF THE INVENTION

The invention relates to an electrical capacitor consisting of a consolidated stack of mutually layered dielectric plies each of which is provided with a metal layer as a coating. The coatings alternately extend from ply to ply up to the ends of two projections which have arisen by means of an incision which proceeds in the direction of the thickness of the stack and approximately in the center of one side thereof. Furthermore, the surfaces formed in the consolidated stack by the ends of the projections are provided with metal layers serving for contacting. The metal layers connect the antipolar coatings to one another.

The invention further relates to a method for the manufacture of such an electrical capacitor, wherein tapes of synthetic plastic metallized on one side are layered on a drum as dielectric plies, particularly having a wave cut at the edge side, to form an originating capacitor. The originating capacitor is divided into the desired individual capacitors perpendicular to the layer planes, whereby capacitatively ineffective intermediate plies are disposed under given conditions on a plurality of dielectric plies and coatings which respectively form a mother capacitor. The capacitatively effective dielectric plies with the coatings for the next mother capacitor are in turn disposed on the intermediate plies. The originating capacitor which has arisen in such manner is provided with frontal contact layers and is subsequently divided in the region of the intermediate plies and in a direction perpendicular thereto.

The periodical "IBM Technical Disclosure Bulletin", Vol. 25, No. 10, March 1983, pages 5366 and 5367, incorporated herein by reference, discloses a multi-layer capacitor with ceramic as the dielectric which comprises the features of the above capacitor. The manufacture of such ceramic multi-layer chip capacitors is disclosed, for example, in U.S. Pat. No. 3,740,624, incorporated herein by reference, and comprises metal spots applied in a specific arrangement on films of pulverized ceramic material and plastic as a binding agent, these films being subsequently stacked on top of one another such that the metal spots are offset relative to one another from layer to layer, and end at different sides in the finished capacitor. The individual capacitors are punched from a compacted, larger stack of such films and are then subjected to the ceramic sintering firing. The introduction of an incision given such ceramic multi-layer capacitors presents considerable technical difficulties since, if these incisions are already produced when the individual capacitors are punched from the film stack, irregularities in the structure can occur during the following sintering or when these incisions are produced at the finish-sintered ceramic stacks. This means a considerable expense for precision instruments because, in particular, very small capacitors are difficult to manipulate, particularly since a considerable reject rate due to breakage must be feared.

Nonetheless, the known capacitors are not without interest as seen in terms of their structure because the specific arrangement of the individual coatings results in a current conduction given which the currents mutually compensate on opposed coatings so that the capacitor has a low-inductance structure overall.

Low-inductance ceramic chip capacitors are disclosed in the periodical "IBM Technical Disclosure Bulletin", Vol. 24, No. 1B, June 1981, pages 437 through 440, incorporated herein by reference. Given these capacitors, the power leads to the antipolar coatings are likewise effected from only one side. This is possible given ceramic chip capacitors because the thickness of the ceramic dielectric layers is greater than 20 $\mu$m and the thickness of the metal coatings amounts to at least 1 $\mu$m. Nonetheless, the method cannot be implemented on a large industrial scale or can only be thus implemented with considerable technical expense.

On the other hand, stack or layer capacitors having plastic films as dielectric are known, these being manufactured according to the method initially specified (see, for example, German Letters Pat. No. 1,764,541, corresponding to U.S. Pat. Nos. 3,670,378 and 3,728,765, incorporated herein by reference. It is thus a matter of mass-produced products having daily production numbers of more than 1 million items.

The drum winding method (wheel winding method) disclosed in the Letters Patent is schematically presented in the Siemens brochure "Ideal für Leiterplatten: MK-Schichtkondensatoren" No. B 21/1210, WS 107520, i.e. 1975 edition, pages 6 and 7, incorporated herein by reference. The capacitors resulting there are shown on pages 4 and 5. The right-hand figure on page 4 practically corresponds to FIGS. 5 and 6 of the German Letters Pat. No. 1,764,541, incorporated herein by reference. See also the English language edition of this Siemens brochure: "Ideally Suitable for PC Board Mounting: Metallized Plastic Layer Capacitors", No. B 21/1210.101, WS 3766, incorporated herein by reference.

These capacitors are regenerable, i.e. the metal coatings are so thin that, given a disruptive breakdown, they evaporate around the breakdown location due to the energy thus released, and thus form an insulation region, as schematically shown on page 3 in the cited brochure The regenerability is also disclosed in the German Letters Pat. No. 832,640 (corresponding to Great Britain Letters Pat. No. 686,293), incorporated herein by reference.

The manufacturing method for layer capacitors is also schematically presented in the Siemens brochure "MK-Schichtkondensatoren nun auch mit Polyester-Dielektrikum", No. B 1687, WS 37725, i.e. 1977, page 5. The English language edition of this Siemens brochure, "Metallized Plastic Layer Capacitors now also with Polyester Dielectric", has the number B 1687.101, WS 37712, i.e. was published in 1977. Both documents are incorporated herein by reference.

For employment in printed circuits, it is necessary that the power lead elements of these capacitors be disposed in grid dimensions, i.e. in a whole multiple of 2.5 mm.

Given the layer capacitors under discussion here and which comprise plastic films as a dielectric, the spacing of wire-like power lead elements is defined by the width of the metallized plastic tapes to be wound onto the drum in combination with the metal layers (end contact layers) disposed at the opposite sides, such as disclosed, for example, in U.S. Pat. Nos. 3,170,211 and 3,693,244, incorporated herein by reference. For reasons that shall be presented in greater detail later in conjunction with the description of the figures, it was previously only possible to obtain layer capacitors having a smallest grid dimension of 5 mm.

Given the manufacture of the layer capacitors under discussion here and comprising plastic films as dielectric, metallized plastic tapes, which are alternately respectively provided with metal-free strips at opposite edges, are wound onto the drum. A curved mother capacitor corresponding to the radius of the winding wheel (usually 25 through 50 cm) or an originating capacitor arises given a plurality of mother capacitors wound onto the wheel and which is provided with metal layers at its end faces by means of metal spraying (Schoop's process, for example according to the U.S. Pat. No. 1,128,058, incorporated herein by reference). After the division of the originating capacitor into mother capacitors, individual capacitors are sawed from these. Various techniques are known to insure that a greater insulation spacing results between the antipolar metal coatings at the sawed surface than corresponds to the thickness of the dielectric layers (15 $\mu$m down to 1 $\mu$m). Thus, the German Letters Pat. No. 17 64 548 (corresponds to U.S. Pat. No. 3,614,561, incorporated herein by reference), proposes the employment of stretched plastic films for this purpose. The sawing is undertaken with a topical heating of the plastic films (without the application of a burn-out voltage) such that a small edge strip of the synthetic is thus provided.

In order to achieve adequate insulation in the region of the cut edge, the German Letters Pat. 17 64 549 (corresponding to U.S. Pat. No. 3,590,347, incorporated herein by reference) proposes that at least one part of the dielectric film be provided with solvent at least in the region of the cut surfaces before the thermal treatment, and be further treated such that the solvent component amounts to about 0.25% there during the thermal treatment. Thus, a collapse of the continuity of the metal coating is achieved in the edge regions.

The German Letters Pat. No. 25 26 130 (corresponding to U.S. Pat. No. 4,041,587, incorporated herein by reference), proposes that the saw blade be coated during the sawing process with an insulating lubricant since the mother capacitor to be divided is provided with a polyolefin film that melts due to the heat developed when sawing. This film is sawed together with the mother capacitor and the saw blade first penetrates the polyolefin films in the region of its engagement, and only then penetrates the capacitively effective region of the capacitor.

In order to enhance the contacting between the metal layers applied to the end faces and the equipolar coatings on each and every side, the German Letters Pat. No. 24 16 566, incorporated herein by reference, discloses an electrical capacitor, particularly a stack or layer capacitor, that is end-contacted with the Schoop process and which contains metallized capacitor films consisting of insulator layers and metallizations whose end-contacted edges have a wavy path. Accordingly, the overall length of the edges only amounts to a few longitudinal waves of the waviness and the frequency of the waviness of the edges of adjacent film plies is different.

Figure 7:
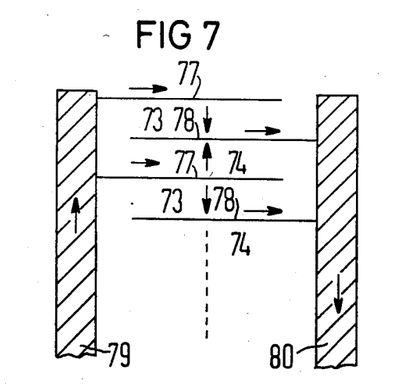
FIG. 7 is a schematic illustration of current passage through a capacitor of the Prior Art.

The references described above with respect to layer capacitors having a plastic dielectric shows that capacitors always result in which the current path proceeds from one end contacting, via the metal coatings and through the dielectric (displacement currents) onto the counter-coatings of the same directions, and from there to the other end contact layer, as shown in FIG. 7. These currents are not compensated and generate a magnetic field.

Such a current path likewise fundamentally applies for so-called capacitative networks such as disclosed in the German Pat. No. 17 64 861 (corresponding to Great Britain Letters Pat. No. 1,220,567, incorporated herein by reference). These capacitors are manufactured according to the method for manufacturing layer capacitors in the fashion described above and are subsequently provided with deep incisions so that internal series connections result.

The simplest form of such a capacitative network having an internal series connection is shown in FIGS. 2 and 3 of German Letters Pat. No. 1,940,036 (corresponds to British Pat. No. 1,289,206, incorporated herein by reference). These figures show two dielectric films from a capacitor which is practically designed in U-shaped fashion due to the incision. The one upper dielectric ply comprises a metal coating which does not extend up to the edge at any side of the U-shape, and which itself is in turn U-shaped.

The other, lower dielectric ply comprises two metal coatings which are only situated on the legs of the U-shape and extend up to the ends of the two U-legs. Such an arrangement of the coatings likewise leads to a current path that is not compensated.

Apart from this, these capacitors are not primarily intended for employment in printed circuits.

An increasingly greater expense for the interference portection and for the stabilization of the supply voltages is required in the field of modern electronics due to the higher and higher operating frequency. Anti-interference capacitors consisting of metal films and a bifilar winding are known. However, they are too large and too expensive for the required uses. Very small ceramic multi-layer capacitors, likewise having a bifilar format, have been recently disclosed, as explained with reference to the two references "IBM Technical Disclosure Bulletin" cited above. These are matched to the demands of modern electronics in terms of their capacitance range and their dimensions. As explained, the manufacturing method for such capacitors is complicated and therefore unsuited for mass production.

SUMMARY OF THE INVENTION

An object of the present invention is to create a layer capacitor with plastic as the dielectric which is low-inductance as a result of the arrangement of the coatings, which can be mass-produced in a simple manner, whose attainable grid dimensions no longer depend on the width of the tapes to be wound, and with which a grid dimension of 2.5 mm can also be achieved.

Another object of the invention is to specify a method for the manufacture of a capacitor as initially specified by means of which the capacitors can be manufactured in extremely high piece numbers and without high, additional capital costs.

In order to achieve this object, the electrical capacitor of the type initially cited has the following features:

(a) the dielectric plies are comprised of plastic films;

(b) the coating is comprised of regenerably thin layers of valve metal and cover a respective surface of the dielectric plies practically up to the edges at the longitudinal sides as well as up to both ends of the projections and, under given conditions, up to the edge of the upper narrow side of the stack which lies opposite the narrow side which contains the incision;

(c) alternating from dielectric ply to dielectric ply, the projections are provided with metal-free insulating strips such that the depth of the incision is either greater than the width of the remaining metal strip or preferably coincides with the inside edges of the insulating strips or extends beyond these edges into the stack;

(d) the metal layers connecting to the antipolar coatings on the surfaces to one another are produced by means of metal spraying.

Plastic films that are 1 to 15 μm thick are preferably employed as the dielectric plies.

It is also advantageous when the dielectric plies comprise metal-free strips in the region of the upper narrow side of the stack because the generation of the edge insulation at this narrow side is facilitated under certain conditions.

Current lead wires which extend in the direction of the longitudinal axis of the stack can be secured to the metal layers. The spacing of these lead wires defines the grid dimension, so that it is abundantly clear that this grid dimension now no longer depends on the width of the tape to be wound.

For the installation of the capacitor in chip format, namely by means of placing the component onto the contact surfaces of the printed circuit, current leads of solderable metal are secured to the metal layers, the current leads are designed in cap-like fashion under given conditions and then surround the feed formed by the projections in the consolidated stack.

The electrical capacitor preferably consists of two single capacitors wherein one narrow side of the first capacitor is coherent with the other narrow side of the second capacitor since the cleaving is not carried out there during manufacture. Such a capacitor represents a pluggable, dimensionally beneficial, so-called ground bypass capacitor. This shall be explained in the description to FIG. 9.

In order to achieve the additional object underlying the invention, the initially specified method for the manufacture of such a capacitor is characterized by the following method steps:

(a) metallized tapes are wound onto the drum, the metallized tapes comprising continuous metal-free strips at one edge under given conditions, whereas intermittent metal-free insulating strips are generated in the regions of the opposite edge and at intervals therefrom in the winding direction, these being generated before or during the winding such that the insulating strips lie in a plane perpendicular to the winding axis when being wound onto the drum and both the ends as well as the beginnings of the insulating strips project into the region of the incision which occurs later or slightly transgress this region;

(b) when being wound onto the drum, the tapes are guided such that the center of the insulating strips of the upper tape proceed symmetrically under the centers of the interstices between the insulating strips of the lower tape;

(c) after the winding and consolidation of the originating capacitors or of the mother capacitors, at least the end face formed of the edges is provided with a metal layer by means of metal spraying while still on the drum;

(d) after the separation into individual mother capacitors, incisions are produced perpendicular to the winding direction in the center between two respective cutting lines, the two projections arising due to the width and depth of the incisions;

(e) division of the individual capacitors, after fastening current leads under given conditions, by means of sawing along cut lines which proceed through the centers of the insulating strips; and (f) finishing the capacitors by means of applying cap-shaped current leads or other current leads, insofar as these have not already been secured in method step (e).

In a modification of this method, in method step (a), the tapes to be wound onto the drum are provided with the intermittently metal-free insulating strips at both edges. In method step (c), both end faces formed by the edges are provided with metal layers by means of metal spraying. In method step (d), the incisions are produced proceeding from both sides of the mother capacitor. In method step (e), the division of the individual capacitors occurs both along the cut line as well as along a cut line that lies parallel to the edges in the center of the mother capacitor.

The metallized tapes to be wound are preferably provided with continuous metal-free strips in their center given this modification of the method.

DESCRIPTION OF THE PREFERRED EMBODIMENTS

Figure 1:
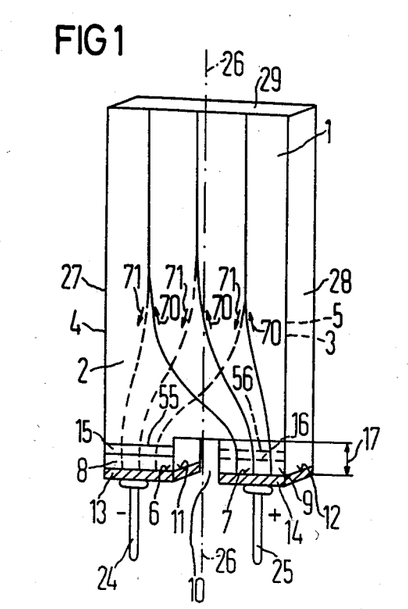
FIG. 1 illustrates a capacitor according to the invention comprising current lead wires.

The electrical capacitor according to FIG. 1 is comprised of a consolidated stack of a plurality of dielectric layers 4 and 5 which are provided with coatings 2 and 3. As a result of an incision 10 in the direction of the thickness of the stack 1, i.e. perpendicular to the dielectric layers 4 and 5, the layers form projections 8 and 9 whose ends 6 and 7 form surfaces 11 and 12 in the consolidated stack 1. Metal layers 13 and 14 which connect the coatings extending up to the ends 6 and 7 are applied to these surfaces 11 and 12. As a result of a metal-free insulating strip 15, the coating 2 on the dielectric layer 4 is not connected to the metal layer 13, whereas the coating 3 on the dielectric layer 5 is not connected to the metal layer 14 due to the metal-free insulating strip 16. This continues in alternating fashion through the entire stack 1.

Current lead wires 24 and 25 are secured to the metal layers 13 and 14, for example by means of soldering or welding.

The depth 17 of the incision 10 in the direction of the longitudinal axis 26 of the stack 1 extends at least beyond the remaining metal strips 20 and 21 (FIG. 4) or up to the inside edges 55 and 56 of the insulating strips 15 and 16. The depth 17 advantageously projects beyond these inner edges 55 and 56 of the insulating strips 15 and 16.

The coatings 2 and 3 on the dielectric plies 4 and 5 extend up to the longitudinal sides 27 and 28 and, under given conditions, up to the narrow side 29 as well. The techniques explained in the above-mentioned German Letters Pat. Nos. 1,764,548, 1,764,549 and 2,526,130, all incorporated herein by reference, serve to achieve an adequate insulation between the coatings 2 and 3. This also applies to the surfaces resulting in the cut 10, for increased insulation is also required there.

The bifilar format is largely realized given the capacitor according to the invention, i.e. the capacitor is very low inductance. The current paths on the coating 2 indicated by the arrows 70 are compensated in terms of their direction by means of the current paths on the coating 3 indicated by the arrows 71. Non-compensated current paths could at most occur in the immediate proximity of the inside end of the incision 10, but their participation is largely negligible in comparison to the other, compensated current paths.

Figure 2:
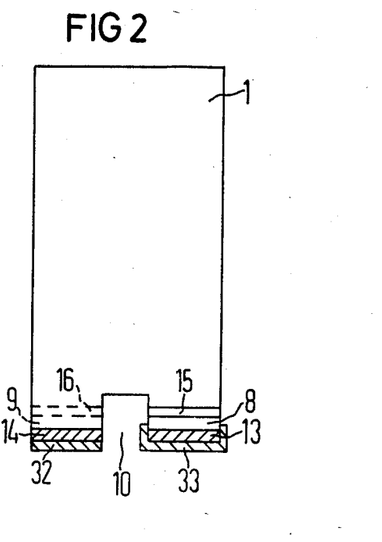
FIG. 2 shows a capacitor according to the invention for incorporation in chip format.

The same reference characters are employed in FIG. 2 for parts which correspond to those in FIG. 1. Instead of current lead wires 24, 25, the capacitor according to FIG. 2 is respectively provided with leads 32 in the form of metal layers or with leads 33 in cap form. These are provided at both feet formed by the projections 8 and 9 which have arisen due to the incision 10 and with the cap partially surrounding the feet. Both of these embodiments of the leads serve for the incorporation of the capacitor as a chip. Given leads 32 in the form of metal layers, the capacitor stands on the contacting locations of the printed circuit and is soldered thereto, whereas the capacitor can also be built-in on the printed circuit given leads 33 in cap form.

Figure 3:
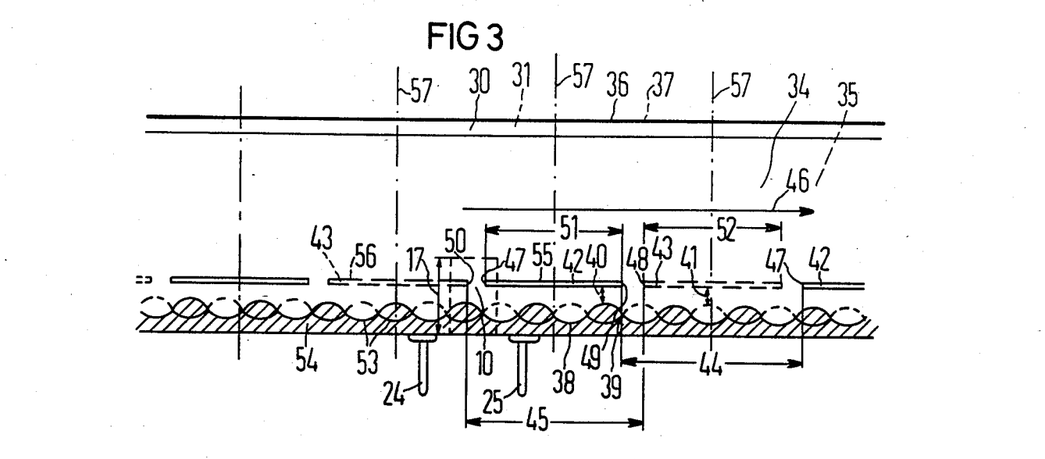
FIG. 3 shows an excerpt from the manufacturing method of the invention.

FIGS. 4, 5, 7, and 8 shall be explained first before explaining the method for the manufacture of capacitors according to the invention with reference to FIG. 3.

Figures 4, 5:
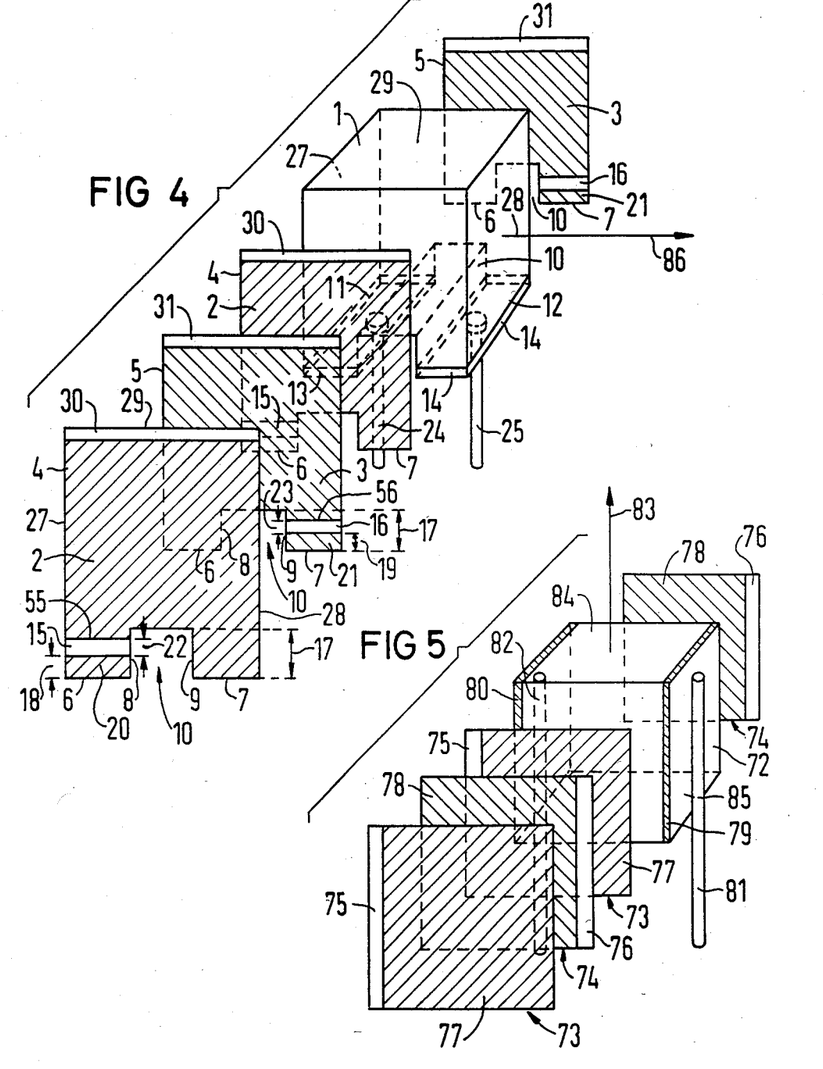
FIG. 4 schematically illustrates a partially disassembled capacitor according to the invention.
FIG. 5 schematically shows a partially disassembled capacitor of the Prior Art.

A layer capacitor 72 of the prior art is shown in FIG. 5 wherein three front dielectric plies 73 and 74 and the last dielectric ply 74 have been separately emphasized in order to illustrate the internal structure. The fact that further cover layers which serve as insulation and are capacitively ineffective are provided above the first dielectric ply 73 and above the last dielectric ply 74 also relate, of course, to the prior art. This is also true of capacitors according to the present invention.

The dielectric plies 73 comprise metal-free strips 75 at the left in FIG. 5, whereas the dielectric plies 74 have metal-free strips 76 at the right. Accordingly, the coatings 77 on the dielectric plies 73 end at the right, and the coatings 78 on the dielectric plies 74 end at the left, in the end faces of the capacitor 72, and are contacted in single polarity fashion to one another there by means of the sprayed metal layers 79 and 80. Current lead wires 81 and 82 are soldered or welded to the metal layers 79 and 80. The arrow 83 indicates the winding direction in which the dielectric tapes provided with the coatings 77 and 78 had been wound on the wheel or drum during manufacture. The cut surfaces 84 and 85 have arisen by means of sawing when separating the individual capacitors from the mother capacitors, the insulation of the cut surfaces having been achieved according to one of the methods disclosed in the afore-mentioned German Letters Pat. Nos. 17 64 548, 17 64 549 and 25 26 130.

Figure 8:
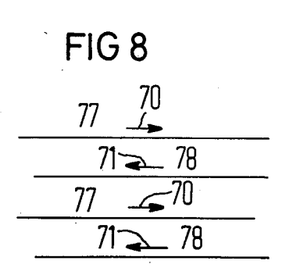
FIG. 8 is a schematic illustration of the current path required for low inductance.

The current paths in such a layer capacitor of the prior art are explained in FIG. 7. The currents flow from the metal layer 79 via the coatings 77 through the dielectric plies 73 (as well as 74) which are not shown here as displacement currents, and then flow on the coatings 78 to the metal layer 80 in the same direction. For compensation, the current paths 70 on the coatings 77 would have to flow oppositely relative to the current paths on the coatings 78, as is schematically shown in FIG. 8. One can certainly see that such an arrangement of the current paths cannot be realized with the layer capacitors of the prior art.

Given the capacitor according to FIG. 4, the first three dielectric plies and the last dielectric ply associated with the stack 1 are likewise shown in separated fashion. The coatings 2 and 3 on the dielectric plies 4 and 5 extend up to the two longitudinal sides 27 and 28 of the stack 1 and they can also extend up to the narrow side 29; in the present exemplary embodiment, however, metal-free strips 30 and 31 are shown along the upper narrow side 29 of the stack 1.

Projections 8 and 9 having ends 6 and 7 have arisen by means of the incision 10. The metal coating 2 on the dielectric plies 4 extends up to the end 7 of the projection 9, whereas the coating 3 on the dielectric plies 5 extends up to the end of the projection 8. Metal-free insulating strips 15 and 16 are disposed on the projections 8 and 9, respectively alternating from dielectric ply 4 to dielectric ply 5, so that remaining metal strips 20 and 21 remain. The depth 17 of the incision 10 should at least project beyond the width 18 or 19 of the remaining metal strips 20 and 21. The depth 17 preferably extends up to the inside edges 55 or 56 of the metal-free insulating strips 15 or 16, or extends somewhat beyond the inside edges. In other words, the depth 17 of the incision 10 is greater than the cumulative widths 18, 19 and 22, or 23, of the remaining metal strips 20, 21 and the metal-free insulating strips 15, 16. In selecting the depth of the incision 10, the thickness of the metal layers 13 and 14 which are situated on the surface 11 and 12 formed by the ends 6 and 7 of the projections 8 and 9 are also to be taken into consideration.

The winding direction in the manufacture of the capacitors according to the invention is referenced 86. Whereas the current lead wires 81 and 82 are disposed parallel to the winding direction 83 given the capacitor 72 (FIG. 5) of the prior art, the current lead wires 24 and 25 given the capacitors of the invention are disposed perpendicular to the winding direction 86.

The inventive method for manufacturing the capacitors of the invention shall be explained below with reference to FIG. 3.

For manufacturing the mother capacitors or the originating capacitor, an upper metallized plastic tape 34 and a lower metallized plastic tape 35 which can be provided with metal-free insulating strips 30 and 31 at their edges under given conditions are wound onto a drum (not shown) in the winding direction 46. The tapes 34 and 35 are preferably provided with a wave-cut at their opposite edges 38 and 39. The purpose of meaning of this wave-cut are explained in the above-cited German Letters Pat. No. 24 16 566, incorporated herein by reference. Briefly stated, the wave-cut serves the purpose of planarly contacting the metal layer 54 generated by means of metal spraying which is applied to the originating capacitor at its end face 53 to the metal layers on the plastic tapes 34 and 35, these metal layers later serving as coatings.

Before or, at the latest, while winding the tapes 34 and 35 onto the drum, intermittently metal-free insulating strips 42 or 43 are generated in the metallizations situated on these tapes, these being generated in the regions of the opposite edges 38 and 39 and at intervals 40 and 41 in winding direction 46. They are preferably generated such that the interstices 44 and 45 between the ends 47 and 48 and the beginnings 49 and 50 of the insulating strips 42 and 43 are greater than the lengths 51 and 52 of the insulating strips 42 and 43.

When being wound on the drum, the tapes 34 and 35 are aligned such that the insulating strips 42 of the upper tape 34 end up practically in the center above the interstices 45 between the insulating strips 43 of the lower tape 35.

After winding a consolidation of the originating capacitors or mother capacitors, at least the end face 53 formed of the edges 38 and 39 is provided with a metal layer 54 by means of metal spraying, for example according to the known schoopage method (see, for example, U.S. Pat. No. 1,128,058, incorporated herein by reference), while still on the drum.

After the division of the originating capacitor into individual mother capacitors, incisions 10 are produced perpendicular to the winding direction 46 in the center between two respective cut lines 57, the width of the incisions 10 preferably being greater than the distance between the ends 47 of the upper insulating strip 42 and the beginning 50 of the lower insulating strip 43. The depth 17 of the incisions preferably extends up to or beyond the inside edges 55 and 56 of the insulating strips 42 and 43. The depth of the incision 10 can also be exploited in order to match the capacitance of the capacitors to a desired, narrow tolerance value. In general, generating the incisions 10 can also be delayed until after the individual stacks 1 have been separated from the mother capacitor.

The leads 24, 25 or 32 (see, for example, FIGS. 1 and 2) can already be secured to the mother capacitor now. However, it is also possible to first separate the individual capacitors by means of sawing along cut lines 57 which proceed through the centers of the insulating strips 42 and 43 and to then attach the power leads. This is particularly recommended when cap-like leads according to FIG. 2 are provided.

The method has a number of advantages over the known method for the manufacture of layer capacitors.

In the known method, the grid dimension is directly related to the width of the tapes to be wound. Only tapes having a width of about 4 mm can be wound for a grid dimension of 5 mm due to the thickness of the end contact layers that must be taken into consideration. Given the manufacture of an originating capacitor wherein a plurality of mother capacitors are wound on top of one another as disclosed in the above-cited German Letters Pat. No. 17 64 541, the height of the originating capacitor is limited in the radial direction given the employment of very narrow tapes, because a uniform guidance is no longer guaranteed. Also, there is a danger that the entire originating capacitor will jump from the drum while still on the drum due to the stack of a mother capacitor overturning. For this reason, layer capacitors for a grid dimension of 2.5 mm can only be wound from one or at most two mother capacitors according to the known method, the method thus becoming extremely uneconomical in mass production.

Given a film width of 4 mm for a grid dimension of 5 mm, the height of the originating capacitor in the radial direction amounts to at most 20 to 30 mm. Given a width of 8 to 9 mm of the tapes to be wound for the grid dimension 10 mm, the height of the originating capacitor in the radial direction already amounts to 50 to 60 mm. Given an even greater width of the tapes to be wound, the height of the originating capacitor is determined by other parameters, for example by the system dimensions for producing the end-face metal layers and the like.

The capacitor of the present invention and the method developed for it are independent of the width of the tapes to be wound with respect to the grid dimension of the power lead elements. The width of the capacitor between two cut lines 57 is to be selected such that two capacitors can stand next to one another given the smallest grid dimension of 2.5 mm on the printed circuit board, i.e. the resulting width of the capacitors is somewhat less than 5 mm, and the lead wires 24 and 25 must be secured to the metal layers 13 and 14 in the grid dimension 2.5 mm. The height of the capacitor in the direction of its longitudinal axis 26 (FIG. 1) can be arbitrary per se and is the determining factor for the capacitance of the capacitor.

Corresponding considerations with respect to the width and height and attachment of the lead wires also apply to capacitors with grid dimensions above 2.5 mm.

In addition to the advantage of particularly simple manufacture which can be implemented with existing facilities without high capital costs, there are thus the additional advantages of the freely selectable width of the tapes to be wound, the attainment of the smallest grid dimension of 2.5 mm, and the extremely low inductance of the capacitors. Furthermore, the insulating strips required for the known layer capacitors for producing the metal-free strips 75 and 76 (FIG. 5) can be eliminated, whereby the division of the initially broad metallized originating films into individual, narrow tapes is simplified.

Figure 6:
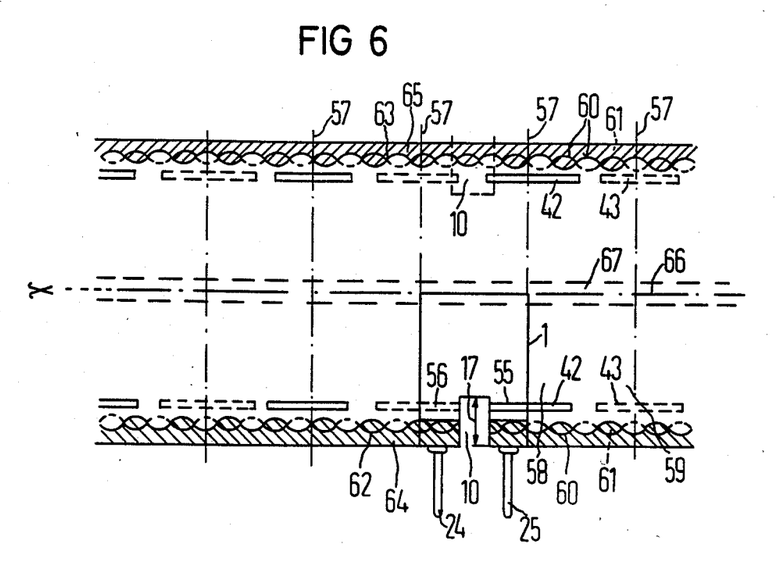
FIG. 6 is an excerpt from a modification of the manufacturing method of the invention.

A particularly simple modification of the manufacturing method is shown in FIG. 6.

Given this method, an upper metallized tape 58 having wave-cuts at both edges 60 and lower metallized tapes 59, likewise having wave-cuts at both edges 61, are wound onto the drum (not shown here or in FIG. 3). The intermittently metal-free strip 42 on the upper tape 58 and the metal-free strips 43 on the lower tape 59 are produced during or shortly before the winding. The same prescriptions as in the method described with reference to FIG. 3 apply for the distances of these metal-free strips from the edges and from one another, and for the guidance of these tapes when being wound onto the drum. After the originating capacitors have been finished, metal layers 64 and 65 are sprayed (Schoop's process) onto the end faces 62 and 63 formed by the edges 60 and 61.

Since the width of the tapes 58 and 59 to be wound has been selected such that it corresponds to the sum of the heights of two capacitors, the mother capacitor is divided both along the cut lines 57 as well as along the center cut line 66, this being accomplished before or after the incisions 10 have been produced.

Under given conditions, a respective metal-free strip 67 which produces the metal-free strips 30 and 31 (FIG. 4) in the finished capacitor is situated in the center of the tapes 58 and 59.

One can see that this method can be executed in a particularly rational fashion, and thus is highly economical because wider films can be employed so that the originating capacitors can be wound higher. This advantage is in addition to the advantages described given the method according to FIG. 4.

Figure 9:
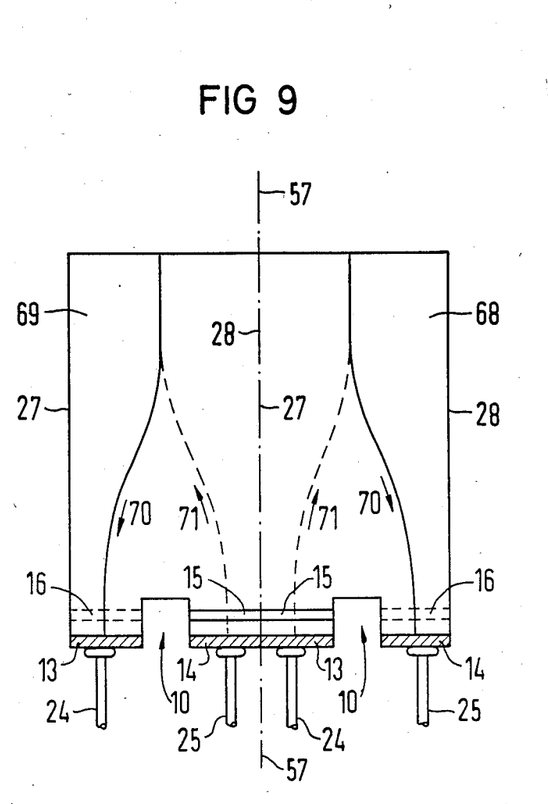
FIG. 9 is a capacitor consisting of two identical individual capacitor sections.

FIG. 9 shows a so-called ground bypass capacitor that is pluggable and has particularly favorable dimensions. Such a capacitor is particularly suited for radio-shielding purposes.

It consists of two individual capacitors 68 and 69, whereby the one narrow side 27 of the capacitor 68 is identical with the other narrow side 28 of the capacitor 69 because no division along the cut line 57 was undertaken during manufacture.

In operation, the line to be radio-shielded is connected to the single polarity lead wires 24 and 25, i.e. the inner lead wires of the capacitors 68 and 69. Unwanted signals are dissipated with low inductance via the outer lead wires 25 and 24 of the capacitors 68 and 69. This capacitor is also constructed in low-inductance fashion by means of corresponding insulating strips 15 and 16 and two incisions 10. When the parting line 57—57 is viewed as an axis of symmetry, then each capacitor half in FIG. 9 is basically identical to the structure of the capacitor according to FIGS. 1 or 2. The indicated current paths 70 and 71 show a high degree of compensation of the current components.

The insulating strips 42 and 43 on the tapes 34, 35, 58 and 59 can be produced in a known manner by means of applying a laser beam or by means of employing an ablation wheel (see, for example, German OS No. 23 48 904, incorporated herein by reference). The laser beam pulses or the ablation clocks of the ablation wheels are controlled in synchronization with the rotation of the drum so that these insulating strips have the proper position and length relative to one another and also with respect to the structure of the mother capacitors given an increasing radius.

List of Reference Characters 1 consolidated stack
2 coating on the dielectric ply 4
3 coating on the dielectric ply 5
4 dielectric ply
5 dielectric ply
6 end of the projection 8
7 end of the projection 9
8 projection at the dielectric ply 4
9 projection at the dielectric ply 5
10 incision in the consolidated stack 1
11 surface at the end of the projections 8 in the consolidated stack 1
12 surface at the end of the projections 9 in the consolidated stack 1
13 metal layer on surface 11
14 metal layer on surface 12
15 metal-free insulating strip
16 metal-free insulating strip
17 depth of the incision 10
18 width of the remaining metal strip 20 on the projection 8
19 width of the remaining metal strip 21 on the projection 9
20 remaining metal strip
21 remaining metal strip
22 width of the metal-free insulating strip 15
23 width of the metal-free insulating strip 16
24 current lead wire
25 current lead wire
26 longitudinal axis of the stack 1
27 longitudinal side of the stack 1
28 longitudinal side of the stack 1
29 upper narrow side of the stack 1
30 metal-free strips
31 metal-free strips
32 lead for incorporation as chip
33 lead in cap form for incorporation as chip
34 upper metallized plastic tape
35 lower metallized plastic tape
36 edge of the tape 34
37 edge of the tape 35
38 opposite edge of the tape 34
39 opposite edge of the tape 35
40 distance between edge 38 and insulating strip 42
41 distance between edge 39 and insulating strip 43
42 insulating strip on tape 34
43 insulating strip on tape 35
44 interstices between the insulating strips 42
45 interstices between the insulating strips 43
46 winding direction
47 end of the insulating strip 42
48 end of the insulating strip 43
49 beginning of the insulating strip 42
50 beginning of the insulating strip 43
51 length of the insulating strip 42
52 length of the insulating strip 43
53 end face
54 metal layer
55 inner edge of the insulating strip 42
56 inner edge of the insulating strip 43
57 cut lines
58 upper metallized tape
59 lower metallized tape
60 edges of the tape 58
61 edges of the tape 59
62 end face
63 end face
64 metal layers on the end fact 62
65 metal layers on the end face 63
66 cut line
67 metal-free strips
68 first capacitor
69 second capacitor
70 arrows for the current paths on the coatings 2
71 arrows for the current paths on the coatings 3
72 layer capacitors (prior art)
73 dielectric plies
74 dielectric plies
75 metal-free strips on the dielectric plies 73
76 metal-free strips on the dielectric plies 74
77 coating on the dielectric plies 73
78 coating on the dielectric plies 74
79 metal layer for contacting the coatings 77
80 metal layer for contacting the coatings 78
81 current lead wire
82 current lead wire
83 winding direction
84 cut surface
85 cut surface
86 winding direction Although various minor changes and modifications might be proposed by those skilled in the art, it will be understood that I wish to include within the claims of the patent warranted hereon all such changes and modifications as reasonably come within my contribution to the art.

I claim as my invention:
1. An electrical capacitor, comprising:
a consolidated stack of layered dielectric plies each of which is provided with a metal coating thereon, said coatings extending alternately from ply to ply up to the ends of one of two projections;

said two projections being formed by an incision extending through all plies in a direction of a thickness of the stack and approximately in a center of one side thereof;

surfaces formed in the consolidated stack by said ends of said projections being provided with metal layers serving for contacting, said metal layers connecting the respective coatings to one another at each projection;

said dielectric plies comprising plastic films and said coatings comprising regenerably thin layers of valve metal and covering a respective surface of said dielectric plies substantially up to edges at lateral sides of the plies substantially up to the ends of said projections, and substantially to a region near an edge of an upper side of said stack which lies opposite a lower side at which a portion of said incision is located;

from dielectric ply to dielectric ply said projections being alternately provided with metal-free insulating strips such that a depth of said incision toward said upper side is greater than a width of a remaining metal strip formed between the metal-free strip and projection end; and said metal layers of the projection ends being metal sprayed layers.

2. An electrical capacitor according to claim 1 wherein the plastic films forming said dielectric plies are 1 to 15 $\mu$m thick.

3. An electrical capacitor according to claim 1 wherein said dielectric plies have metal-free strips at the upper sides thereof.

4. An electrical capacitor according to claim 1 wherein power lead wires which extend in a direction perpendicular to the projection ends of said stack are secured to said projection end metal layers.

5. An electrical capacitor according to claim 1 wherein for incorporation of said capacitor in a chip structure, a solderable metal structure is secured to each of said end projection metal layers, said structures having a cap-like shape surrounding feet formed by said projections.

6. An electrical capacitor according to claim 1 wherein a depth of said incision is a function of a specific desired capacitance of the capacitor.

7. An electrical capacitor according to claim 1 wherein the capacitor is formed of two capacitor sections each of which is identical with the other about a symmetry line.

8. An electrical capacitor according to claim 1 wherein the depth of the incision toward the upper side extends at least to a side edge of the metal-free insulating strip toward said upper side.

9. An electrical capacitor according to claim 8 wherein the depth of the incision extends beyond said inside edge of the metal-free insulating strip toward said upper side.

10. An electrical capacitor, comprising:

a consolidated stack of layered dielectric plies each of which comprises a plastic film with a metal coating on one side thereof;

each ply having first and second projections at a bottom edge thereof and wherein a metal coating extending to an end of either the first or second projection in alternating fashion from ply-to-ply, the projection at which the coating does not extend to the end having a metal-free insulating zone therein;

a metal layer covering the ends of the plies at the ends of the first and second projections of the consolidated stack of plies, said metal layers being sprayed layers which make contact with the coatings on an alternate basis at the respective projections;

first and second contact means connected to the respective metal layers of the first and second projections; and said first and second projections being formed by an incision cut in each of the plies.

11. A method for the manufacture of electrical capacitors, comprising the steps of:

providing at least first and second tapes of plastic metallized on one side, each tape having a wave cut at a lower edge side;

at an upper edge of each of the tapes, providing a continuous metal-free strip zone and in a vicihity of a lower edge of each of the tapes providing spaced metal-free insulating strips along a longitudinal extent of the first and second tapes, given intervals being provided between the metal-free insulating strips;

winding the first and second tapes onto a drum one over the other such that the metal-free zones of the top edges are aligned and wherein a center of insulating strips of the first tape is aligned over a center of said insulating strip interval of the second lower tape;

after winding the first and second layers, providing a metal layer on an end face at the wave cut edge sides by spraying while the first and second tapes are still on the drum;

providing incisions centrally of intended respective cut lines to form individual capacitors at the end face provided with the sprayed metal layer so that first and second projections will be provided for each individual capacitor after cutting along the cut lines, said incisions being provided so that they intercept one of the metal-free insulation layers on the first tape but not the metal-free insulation layer on the second tape lying underneath, said incision lying substantially centrally of one end of the metal-free insulation strip in the first tape and an adjacent end of the metal-free insulation strip of the second tape lying therebelow; and fastening connection means to the metal layer at lateral sides of the incision and forming the individual capacitors by cutting along the cut lines in a direction perpendicular to a winding direction of the first and second tapes.

12. A method according to claim 11 wherein cap-shaped current leads are applied over ends of the projections.

13. A method according to claim 11 wherein the first and second tapes to be wound onto the drum are provided with intermittently metal-free insulating strips at upper and lower edges of the tape; both end faces formed of the upper and lower edges are provided with metal layers by metal spraying; the incisions are produced at both end-faces; and a division of the individual capacitors occurs both along said cut lines perpendicular to the winding direction as well as along a cut line which lies parallel to the upper and lower edges.

14. A method according to claim 13 wherein the first and second metallized tapes to be wound are provided with a continuous metal-free strip centrally thereof in the winding direction.

15. A method according to claim 11 wherein manufacture of the intermittent metal-free insulating strips on the tapes occurs by means of applying laser beams, laser pulses being controlled in synchronization with rotation of the drum in order to achieve a desired position and length of the metal-free insulating strips relative to one another.

16. A method for manufacturing an electrical capacitor, comprising the steps of:
providing first and second tapes with each tape having a metal coating thereon at one side thereof;
providing spaced metal-free insulating strips in a region of the tapes adjacent a lower edge thereof and having a longitudinal extent and alignment in a winding direction of the tapes when they are wound on a drum;
winding the first and second tapes on the drum such that the metal-free insulating strips of the first tape are in alignment with and lie centrally between the adjacent metalfree insulating strips lying therebelow on the second tape;
providing cut lines to make individual capacitors from a mother capacitor created on the drum;
making an incision at the lower edge of the first and second tapes at each location centrally between adjacent cut lines, said incision having a depth extending towards an upper edge of the first and second tapes such that the incision extends at least from the lower edge to intersect one end of an insulating strip of one of the tapes and the adjacent end of the insulating strip of the other tape, said incision being centrally located at an interval between the adjacent ends of the respective metal-free insulating strip of the first tape and insulating strip of the second tape;
providing a metal layer to cover and make contact with alternate metal coatings at respective projection legs formed as a result of the incision at the lower end of the tapes;
connecting contact structures to the metal layers at lateral sides of the incisions; and
providing the individual capacitors by making cuts along the cut lines.

* * * * *